Figures 1, 2:
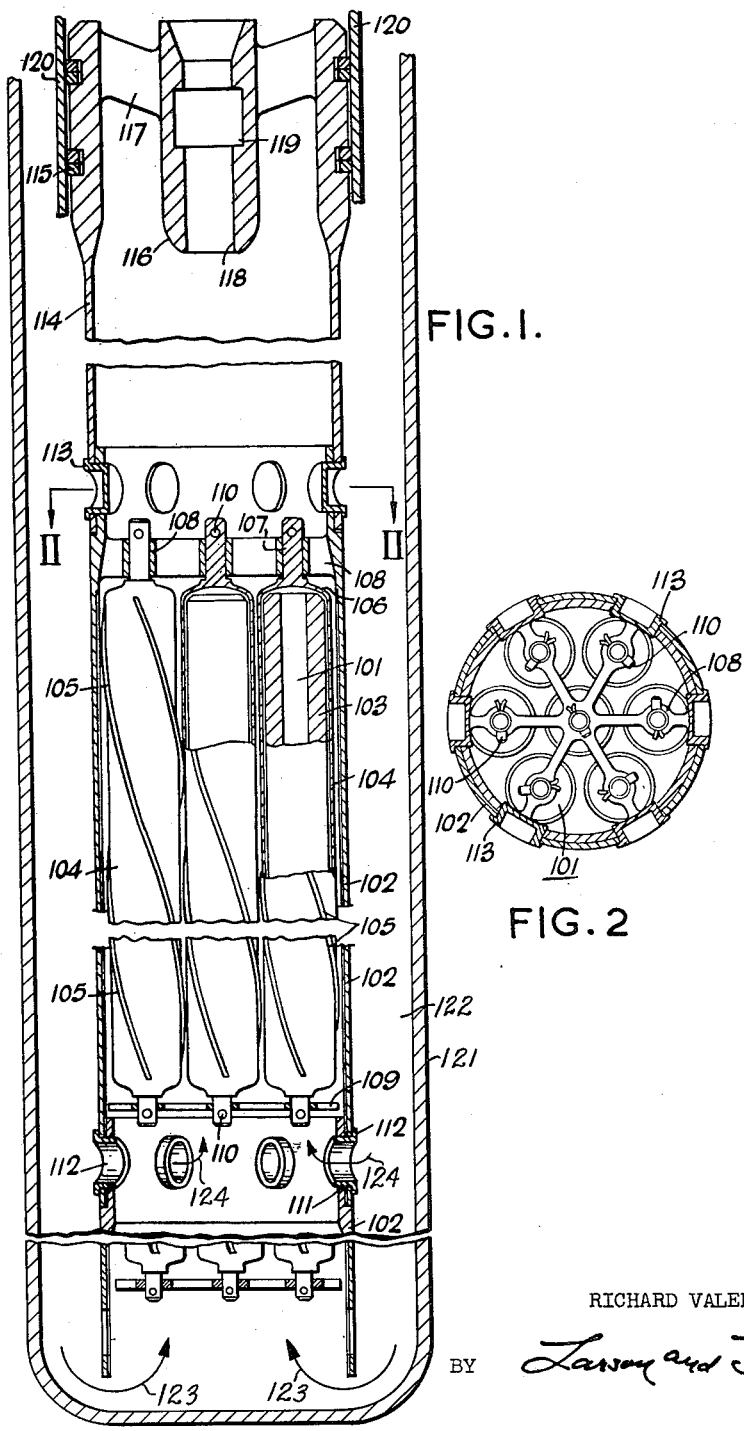

INVENTOR
RICHARD VALENTINE MOORE
BY
ATTORNEYS

United States Patent Office 3,089,837
Patented May 14, 1963

3,089,837
FUEL ELEMENTS FOR NUCLEAR REACTORS
Richard Valentine Moore, Appleton, England, assignor to United Kingdom Atomic Energy Authority, London, England
Filed June 24, 1958, Ser. No. 744,090
Claims priority, application Great Britain June 24, 1957
2 Claims. (Cl. 204—193.2)

This invention relates to nuclear reactors and has an application in the sodium graphite reactor disclosed in detail in copending application Serial No. 744,185 of even date, filed in the names of Long and Challender, now U.S. Patent No. 3,000,728.

In one cooling system, sometimes referred to as the "re-entrant" system, for nuclear reactors using solid nuclear fuel, the coolant channels are constructed from thimble-shaped tubes divided by a sleeve into inner channels which are inside the sleeve and outer annular spaces between the sleeve and thimble tube. The fuel elements are located inside the sleeve and coolant is arranged to flow first along the outer annular spaces and then over the fuel elements in the inner channels, ensuring that the higher coolant temperatures are reached where the coolant is in contact only with components which can be readily discharged from the reactor should the hot coolant corrode them. A disadvantage of such a system however is the limits which may be imposed on the overall design by the considerable pressure drop in the coolant as it flows through the outer channel and over the fuel element. The pressure loss may be reduced by increasing the size of the fuel element channels but this may upset other design features and it results in a larger volume of coolant in the reactor core, which is particularly undesirable where the coolant is a neutron absorber like sodium.

The present invention provides an improved fuel element for use in a nuclear reactor having a re-entrant system of cooling.

A fuel element according to the invention comprises a sleeve suitable for location in a thimble-shaped tube in a reactor to divide the tube into an inner channel and an outer annular space, nuclear fuel carried in the sleeve and perforations in said sleeve in the region of the fuel allowing a fraction of the coolant fluid flowing along the sleeve to pass through the sleeve.

In this arrangement the pressure drop in the coolant is no longer that of all coolant traversing the whole path of the outer annular space and the inner channel, but is something less depending upon the size of the fraction of coolant passing through the perforations in the sleeve and the location of the perforations. The reduced pressure drop can be achieved without degrading the outlet temperature of the coolant or reducing the reactor rating.

The invention will now be described with reference to the accompanying drawings in which FIGURE 1 is an elevation partly sectioned and FIGURE 2 is a sectional view on the line II—II of FIGURE 1.

In the drawings nuclear fuel in the form of a series of clusters of seven fuel rods 101, one cluster above the other, is housed in a long sleeve made from an assembly of double walled sleeves 102. The fuel rods 101 comprise uranium tubes 103 in protective stainless steel sheaths 104 with shallow helical fins 105 and welded end caps 106. The end caps 106 carry plugs 107 which serve to support the fuel rods 101 in spiders 108 and locate them at their lower ends in spiders 109. The spiders 108 are attached to the sleeves 102 and the spiders 109 are a loose fit in the sleeves. Split pins 110 fix the fuel elements 101 in the spiders 108, 109.

The sleeves 102 have perforations 111 and are joined together by tubular pins 112 passing through and expanded into perforations 111 in adjacent sleeves 102. The top perforations 111 are blocked off by connecting pins 113 which connect the top sleeve 102 with a tube 114 having piston rings 115 to seal with an outer sleeve 120, the tube 114 carrying a boss 116 on webs 117. The boss 116 has a central bore 118 with a recessed part 119 which can accommodate an expandible tool for lifting the fuel element assembly. The assembly is shown suspended in a thimble shaped tube 121 so as to leave an annular space 122 between the sleeve 102 and the tube 121. The tube 121 is fitted into a fuel element channel in a nuclear reactor so as to provide a fuel element coolant channel.

In operation the fuel rods 101 are assembled in the sleeves 102 which are then coupled together by the tubular pins 112 and attached to the tube 114 by connecting pins 113. The assembly of tube 114, sleeves 102 and fuel rods 101 is loaded into a fuel element channel containing a tube 121 so as to leave the annular space 122 between the tube 121 and the sleeves 102. Coolant sodium is fed into the annular space and flows down through the reactor, most of the sodium making a complete path along the outside of the sleeves 102 and up the inside of the sleeves 102 over the fuel rods 101 as indicated by arrows 123. Some of the sodium, however, short circuits the complete coolant flow path by passing through the perforations defined by the tubular pins 112 as indicated by arrows 124, for example. This short circuit flow decreases the pressure loss which would be experienced compared with all the sodium flowing over the complete path. The temperature of the coolant leaving the fuel elements to flow along the tube 114 need not be degraded as a consequence of the short circuit flow.

I claim:
1. In combination with an outer sleeve for suspension within a thimble-shaped tube disposed upright in a vertical channel in the moderator of a nuclear reactor, a nuclear fuel element comprising a sleeve having perforations in the walls thereof and extending from within a terminal portion of the outer sleeve to a point outside of the terminal portion so as to form a telescopic extension of said outer sleeve, and means mounted in the tube for supporting fuel rods therewithin in the region of the perforations, the perforations being of such size as to admit to the interior of the tube a minor proportion of fluid coolant passed through an annular space defined by the outer sleeve and the thimble-shaped tube within the channel.

2. The combination according to claim 1 further comprising means on the sleeve for engagement with means for withdrawing the sleeve through the outer sleeve.

References Cited in the file of this patent
UNITED STATES PATENTS
2,782,158    Wheeler _____ Feb. 19, 1957

OTHER REFERENCES
International Conf. on Peaceful Uses of Atomic Energy, 1955, vol. 2, pages 337–350; 44.